United States Patent
Lutz et al.

(10) Patent No.: US 12,400,316 B2
(45) Date of Patent: Aug. 26, 2025

(54) DETERMINING THE LEVEL OF WEAR OF A TOOL

(71) Applicant: Siemens Aktiengesellschaft, Munich (DE)

(72) Inventors: Benjamin Samuel Lutz, Munich (DE); Daniel Regulin, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 637 days.

(21) Appl. No.: 17/631,776

(22) PCT Filed: Jul. 22, 2020

(86) PCT No.: PCT/EP2020/070666
§ 371 (c)(1),
(2) Date: Jan. 31, 2022

(87) PCT Pub. No.: WO2021/023514
PCT Pub. Date: Feb. 11, 2021

(65) Prior Publication Data
US 2023/0360192 A1   Nov. 9, 2023

(30) Foreign Application Priority Data
Aug. 2, 2019   (DE) .................. 10 2019 211 656.6

(51) Int. Cl.
*G06T 7/00* (2017.01)
*G06T 7/60* (2017.01)

(52) U.S. Cl.
CPC ............ *G06T 7/001* (2013.01); *G06T 7/60* (2013.01); *G06T 2207/10056* (2013.01);
(Continued)

(58) Field of Classification Search
CPC .................. G06T 7/001; G06T 7/60; G06T 2207/10056; G06T 2207/20036;
(Continued)

(56) References Cited

U.S. PATENT DOCUMENTS 4,700,224 A * 10/1987 Miyasaka ............... G01N 3/56
                                                       382/152
4,845,763 A *  7/1989 Bandyopadhyay .... G01B 11/24
                                                       382/152
(Continued)

FOREIGN PATENT DOCUMENTS

| CN | 109003689 A | 12/2018 | ............. G21C 17/08 |
| CN | 109410208 A |  3/2019 | ............... G06K 9/62 |
| DE | 10 2017 008 158 | 3/2018 | ......... G05B 19/4065 |

OTHER PUBLICATIONS

Search Report for International Application No. PCT/EP2020/070666, 12 pages, Oct. 26, 2020.
(Continued)

*Primary Examiner* — Roy M Punnoose
(74) *Attorney, Agent, or Firm* — Slayden Grubert Beard PLLC

(57) ABSTRACT

Various embodiments include a computer-implemented method for determining a level of wear of a tool. The method includes: obtaining an image data set mapping a wear-relevant region of the tool; allocating, using a computing unit and an artificial neural network, one class of a predetermined quantity of classes to each image point of a plurality of image points of the image data set; and determining a characteristic value based on a result of the allocation for the level of wear. The quantity of classes includes at least one wear class.

14 Claims, 2 Drawing Sheets

(52) U.S. Cl.
CPC .............. *G06T 2207/20036* (2013.01); *G06T 2207/20081* (2013.01); *G06T 2207/20084* (2013.01); *G06T 2207/30164* (2013.01)

(58) Field of Classification Search
CPC ........... G06T 2207/20081; G06T 2207/20084; G06T 2207/30164; G06T 7/0004; G06N 3/045; G06N 3/08
See application file for complete search history.

(56) References Cited

U.S. PATENT DOCUMENTS

| | | | | |
|---|---|---|---|---|
| 5,361,308 | A | * | 11/1994 | Lee .................... B23Q 17/2495 356/520 |
| 2016/0091393 | A1 | * | 3/2016 | Liao ...................... G01M 13/00 702/34 |
| 2018/0067471 | A1 | * | 3/2018 | Saitou .............. G05B 19/40932 |
| 2018/0272491 | A1 | * | 9/2018 | Yang .................. B23Q 17/0971 |
| 2019/0145183 | A1 | * | 5/2019 | Potash ................... E21B 10/00 700/175 |
| 2021/0294297 | A1 | * | 9/2021 | Maushart ........... B23Q 17/2457 |

OTHER PUBLICATIONS

Nash, Will et al: "A review of deep learning in the study of materials degradation", NPJ Materials Degradation, vol. 2, No. 1, 15. XP055689360, Nov. 15, 2018.

Atha, Deegan J. et al: "Evaluation of deep learning approaches based on convolutional neural networks for corrosion detection", SHM. Structural Health Monitoring, vol. 17, No. 5), pp. 1110-1128, XP055740054, GB, Sep. 5, 2018.

Search Report for DE Application No. 10 2019 211 665.6, 8 pages, Aug. 6, 2020.

Sang, Hong Qiang et al., "Tool Wear Detection Based on Workpiece Texture and Convolutional Neural Network," School of Mechanical Engineering, Tianjin Key Laboratory of Advanced Mechatronic Equipment Technology, Tianjin 300387, No. 7, 5 pages (Chinese w/ English abstract), Jul. 15, 2019.

Li, Lingguang et al., "A Novel Method for Accurately Monitoring and Predicting Tool Wear Under Varying Cutting Conditions Based on Meta-Learning," CIRP Annals—Manufacturing Technology, vol. 68, No. 1, 4 pages, Jul. 22, 2019.

Chinese Office Action, Application No. 202080055443.4, 23 pages, Apr. 18, 2025.

* cited by examiner

DETERMINING THE LEVEL OF WEAR OF A TOOL

CROSS-REFERENCE TO RELATED APPLICATIONS

This application is a U.S. National Stage Application of International Application No. PCT/EP2020/070666 filed Jul. 22, 2020, which designates the United States of America, and claims priority to DE Application No. 10 2019 211 656.6 filed Aug. 2, 2019, the contents of which are hereby incorporated by reference in their entirety.

TECHNICAL FIELD

The present disclosure relates to industrial production. Various embodiments of the teachings herein include a computer-implemented method for determining a level of wear of a tool, wherein an image data set is provided that maps a wear-relevant region of the tool, computer-implemented methods for training an artificial neural network to determine a level of wear of a tool, analysis systems for determining a level of wear of a tool, and/or computer programs.

BACKGROUND

Tool wear contributes significantly to production costs in industrial production. In addition to the elapsed use time of the tool, the tool wear for example depends on the material that is processed and the processing parameters and increases continuously, however said tool wear is generally not linear. If the tool wear reaches a maximum wear that is permitted and that is determined beforehand, the tool is therefore worn-out. If a worn-out tool continues to be used, component quality and processing power decreases significantly.

In order to avoid this, tools are often exchanged prior to when this would be necessary with regard to the maximum wear. As a consequence, tool costs increase on account of the unutilized use time of the tool. Also, the dependency upon the wear increase of the material that is to be processed and a batch dependency in the case of tools that are identically specified lead to difficulties in the estimation of the level of wear and as a consequence this leads to the tendency to change tools too early.

The level of wear of tools is estimated in industrial production by means of calculating methods. For this purpose, machine signals such as for example vibrations, acoustic emissions, cutting forces, machine currents and the like are evaluated. However, on account of the indirect nature of this method an estimation of the level of wear with a high degree of accuracy is not possible. Moreover, the methods that are used are frequently limited in the application to specific tool types or cutting geometries.

Document US 2016/0091393 A1 describes for example a method in which the operating parameters of a machine are determined, in particular position parameter and movement parameter, for example spindle speed or feed rate. Parameters are extracted by means of a cluster analysis and the trend of said parameters is drawn upon for the estimation of the level of wear.

In other approaches, tools are measured by means of a laser beam, which renders it possible to identify cases of failure such as for example a rupture of the tool. An exact determination of the level of wear is however not possible in this manner.

SUMMARY

The teachings of the present disclosure include an improved concept for determining a level of wear of a tool, wherein said concept can be flexibly applied to various tool types and renders possible a more precise determination of the level of wear. For example, some embodiments include a computer-implemented method for determining a level of wear of a tool (16), wherein an image data set (10) is provided that maps a wear-relevant region (11) of the tool (16), characterized in that by means of a computing unit (12) and using an artificial neural network (13) a class of a predetermined quantity of classes is allocated to each image point (14) of a plurality of image points of the image data set (10), wherein the quantity of classes includes at least one wear class; and based on a result of the allocation at least one characteristic value is determined for the level of wear.

In some embodiments, the neural network (13) is applied by means of the computing unit (12) for each of the image points (14) to a surrounding area (15) of the respective image point (14) in order to allocate one of the classes to the respective image point (14).

In some embodiments, the surrounding area (15) includes the respective image point (14) and also all the image points that adjoin the respective image point (14); or the surrounding area (15) includes the respective image point (14) and also all the remaining image points that have a spacing with respect to the respective image point (14) and said spacing is smaller than a predetermined maximum spacing, or the surrounding area (15) includes the respective image point (14) and also all the remaining image points that have one row spacing with respect to the respective image point (14) and said row spacing is smaller than a predetermined maximum row spacing, and said image points have one column spacing with respect to the respective image point (14) and said column spacing is smaller than a predetermined maximum column spacing.

In some embodiments, the result of the allocation is processed by means of the computing unit (12) with the aid of a morphologic image processing operation; and the at least one characteristic value for the level of wear is determined based on the processed result.

In some embodiments, a proportion of the image points that have been allocated to the at least one wear class is determined by means of the computing unit (12) and a wear area is determined based on the proportion as a characteristic value for the level of wear.

In some embodiments, by means of the computing unit (12) a further proportion of image points, which have been allocated to the at least one wear class, is determined for a column or a row of image points of the plurality of image points; a wear mark width of the column or row is determined based on the further proportion; and a further characteristic value is determined based on the wear mark width.

In some embodiments, by means of the computing unit (12) a respective further proportion of image points, which have been allocated to the at least one wear class, is determined for at least one further column or row of image points of the plurality of image points; a respective further wear mark width of the respective further column or row is determined based on the respective further proportions; and the further characteristic value is determined based on the wear mark width and the further wear mark widths.

In some embodiments, the wear-relevant region (11) is mapped by means of a camera (17) in order to generate and to provide the image data set (10).

In some embodiments, one of the at least one characteristic value is compared with at least one predetermined limit value by means of the computing unit (12); and a value that relates to a remaining use time of the tool (16) is determined in dependence upon a result of the comparison.

As another example, some embodiments include a computer-implemented method for training an artificial neural network (13) to determine a level of wear of a tool (16), wherein a training image data set (18) is provided that maps a wear-relevant region (11) of a reference tool, characterized in that a reference allocation of each image point (14) of a plurality of image points of the training image data set (18) to a class of a predetermined quantity of classes is provided, wherein the quantity of classes includes at least one wear class; and by means of a training computing unit, an output of the neural network (13) is calculated for each of the image points and the output is compared with the reference allocation; and by means of the training computing unit, the neural network (13) is adapted in dependence upon a result of the comparison in order to train the neural network (13).

In some embodiments, the neural network (13) is or has been trained by means of a method as claimed in claim 10.

As another example, some embodiments include an analysis system for determining a level of wear of a tool (16) and said analysis system has a computing unit (12) and also a storage unit (19) and an image data set (10) is stored on the storage unit and said image data set maps a wear-relevant region (11) of the tool (16), characterized in that the computing unit (12) is configured so as to allocate to each image point (14) of a plurality of image points of the image data set a class of a predetermined quantity of classes using an artificial neural network (13), wherein the quantity of classes includes at least one wear class; and to determine at least one characteristic value for the level of wear based on a result of the allocation.

In some embodiments, the analysis system (20) has a microscope camera apparatus (17) that is configured so as to map the wear-relevant region (11) of the tool (16) in order to generate the image data set (16).

In some embodiments, the neural network (13) has been trained by means of a method as claimed in claim 10.

As another example, some embodiments include a computer program having commands and when the computer program is implemented by a computer system, the commands trigger the computer system so as to implement a method as described herein.

BRIEF DESCRIPTION OF THE DRAWINGS

The teachings herein are further explained below with reference to specific exemplary embodiments and associated schematic drawings. In the figures, identical or functionally identical elements can be provided with the same reference numerals. The description of identical or functionally identical elements where applicable is not necessarily repeated in relation to different figures. In the figures.

DETAILED DESCRIPTION

Figure 1:
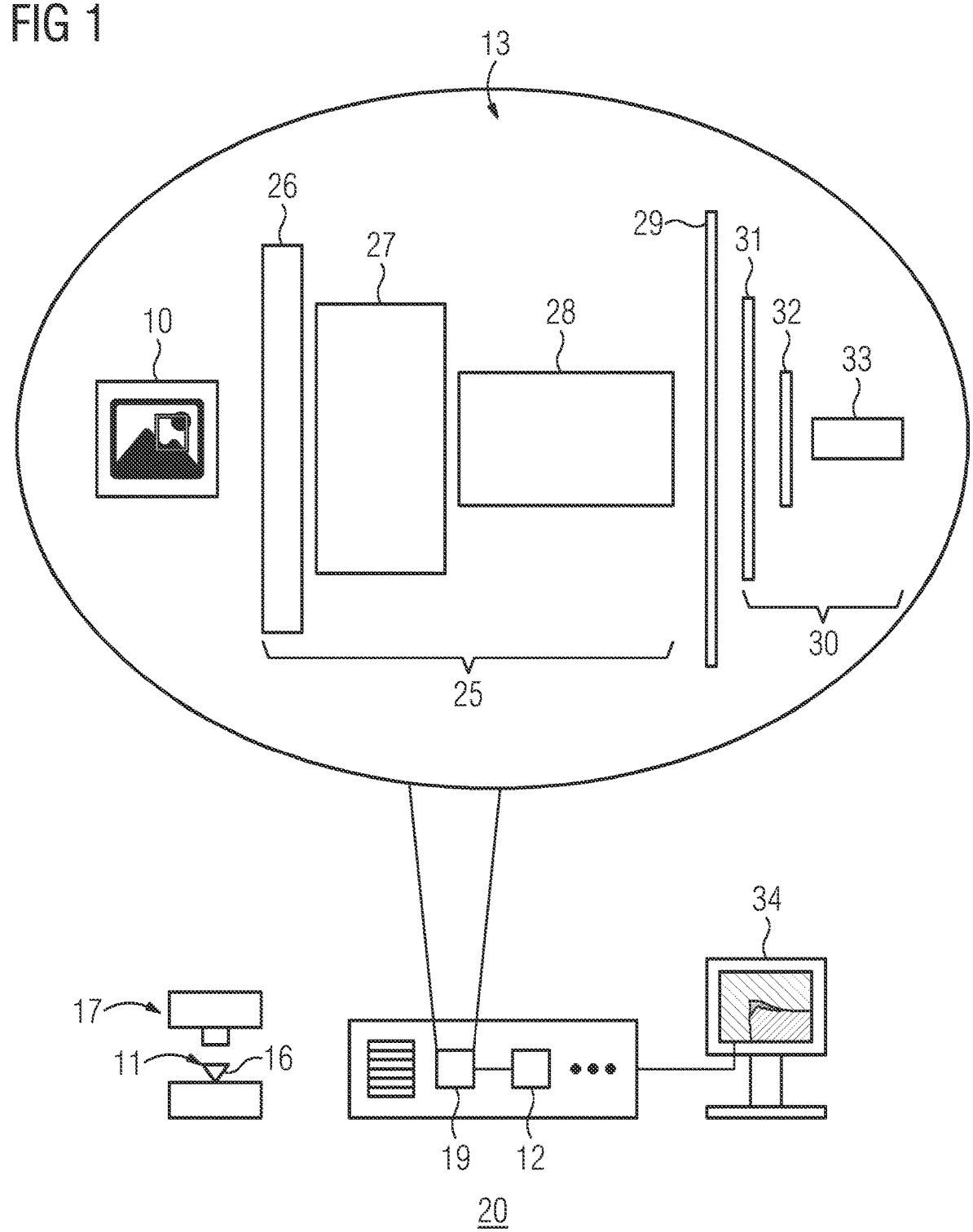
FIG. 1 shows a schematic illustration of an exemplary embodiment of an analysis system incorporating teachings of the present disclosure.

The present disclosure includes the idea to analyze, by way of an artificial neural network, image data that maps the tool, wherein a plurality of image points of the image data set is in each case allocated a class by means of the neural network. Based on a result of the analysis, a characteristic value is determined for the level of wear.

In some embodiments, there is a computer-implemented method for determining a level of wear of a tool. In this case, an image data set is provided that maps a wear-relevant region of the tool. By means of a computing unit and using an artificial neural network, in particular a trained neural network, for example a convolutional neural network, a class of a predetermined quantity of predetermined classes is allocated respectively to each image point of a plurality of image points of the image data set. The plurality of image points includes in particular three or more image points. The quantity of classes includes at least one wear class. Based on a result of the allocation of the image points of the plurality of image points to in each case a class, at least one characteristic value is determined for the level of wear by means of the computing unit.

In some embodiments, the image data set is in particular a digital image of an image sensor, for example a CMOS sensor, for example of a camera, in other words in particular a digital camera image. The image data set has a two-dimensional arrangement of image points that can also be referred to as pixels, wherein the arrangement of image points is provided in particular in columns and rows.

The plurality of image points can include for example all the image points of the image data set or a predefined subset of the image points of the image data set. For example, the plurality can include a predetermined fraction of image points of the image data set, for example every second image point, every fourth image point or the like. In the event that the plurality of image points includes a subset of image points of the image points of the image data set and not all the image points of the image data set, then the image points of the plurality for example can be spatially evenly distributed or approximately evenly distributed.

The tool can be a processing tool for a tool machine, for example a cutting tool such as for example a rotary tool, a lathe tool, a milling tool or a drill. In particular, the tool can be an indexable cutting insert.

The wear-relevant region of the tool is in particular a region, for example a surface, of the tool, wherein said region is subject to wear and therefore changes on account of the intended use of the tool and the change of said region can limit a function, usability, load-bearing capacity or power of the tool or the change of said wear correlates with a limited function, usability, power or load-bearing capacity. In some embodiments, the wear-relevant region can be a cutting edge or part of a cutting edge of a cutting tool, for example an indexable cutting insert, a drill, a milling tool or a rotary tool.

In some embodiments, the provision of the image data set includes in particular the provision of the image data set in a computer readable form, in particular in such a manner that said image data set can be read by the computing unit for processing by means of the neural network. The provision of the image data set includes in particular the storage of the image data set on a storage medium or a storage unit and the provision of the storage medium or the storage unit.

An image point can correspond for example to an individual sample value of an image sensor, in the case of a CMOS sensor for example a value that is measured by means of a photo detector or a photo diode. The image data set can however also be pre-processed with the result that for example individual sample values are combined to form effective image points and an image point with the understanding underlying herein can also correspond to an effective image point.

While in each case a class is allocated to the plurality of image points, in particular one of the classes is allocated individually to each individual image point of the plurality of image points. For example, for each allocation of an image point to a class by means of the computing unit a characteristic value can be determined for a probability with which the allocation is correct.

The neural network can be understood for example as a software code or a combination of multiple software code components, wherein the software code or the software code components are stored in computer readable form, for example on the storage medium or the storage unit. The neural network can be understood in particular as a software module or can include one or multiple software modules. The computing unit can read or implement the neural network, in other words can implement the software code or the software code components.

In some embodiments, the neural network is in particular embodied as a convolutional neural network, CNN. This means that the neural network has at least one convolutional layer. In particular, the neural network can also have conventional, in particular non-convolutional, layers for example fully connected levels, for example one or multiple fully connected levels. Nevertheless, the neural network is also referred to below in these cases as a convolutional neural network or CNN.

The result of the allocation includes in particular information relating to the allocation or the allocation result of the individual image points to the respective classes. The result of the allocation can include for example for each image point of the plurality of image points the information regarding which class of the predetermined quantity of classes has been allocated to this image point. The result can also include the respective characteristic values for the probability that the allocation is correct.

In contrast to the approaches that are known from the prior art, the methods described herein do not use an indirect extrapolation based on other machine parameters in order to estimate the level of wear but rather the wear-relevant region of the tool is directly visually analyzed. As a consequence, a more complicated, non-linear relationship between elapsed use time of the tool and increase in wear does not play any role for the analysis according to the improved concept, the same is true with batch dependencies. As a consequence, a clearly more accurate analysis or determination of the level of wear is possible.

As a consequence, it is in particular possible to avoid the tool being exchanged unnecessarily early. This leads to cost savings that can be significant, in particular in an industrial production environment. Tool heads of modern tool machines can have up to 50 cutting edges that are exchanged at a temporal interval that can amount to a few minutes to multiple hours depending on the tool material and the material that is processed. The methods described herein render it possible to also determine the level of wear independently of external interferences or environmental influences. Moreover, it is possible to identify different types of wear using the improved concept.

By using the artificial neural network, the direct visual analysis of the wear-relevant region is possible without general limitations being provided to a specific tool type or cutting geometry. This makes the methods particularly flexible to use.

In some embodiments, it is not the entire image, in other words the entire image data set, that is allocated to a class. In lieu of this, a dedicated class is allocated to each image point of the plurality of image points independently of one another. On account of this pixel-by-pixel analysis, the computing outlay is reduced, in particular during training of the neural network. Moreover, it is possible in this manner to realize a particularly accurate analysis and thereby to determine the level of wear more precisely.

In some embodiments, the image data set is provided with a resolution in a range between 1 image point/mm to 500 image points/mm, for example 50 image points/mm to 150 image points/mm, preferably approximately 100 image points/mm. An exact and reliable determination of the level of wear is rendered possible by an accordingly high resolution.

The at least one wear class can have for example precisely one wear class or more than one wear class, wherein different wear classes can correspond to different types of wear indicators, different wear mechanisms or different wear types.

In addition to the at least one wear class, the predetermined quantity of classes can include for example a background class and/or a class for an undamaged tool surface. The background class is allocated for example to an image point if the corresponding image point does not lie on the tool. The class for the undamaged tool surface is allocated for example to an image point if the respective image point lies on the tool and does not display any wear. The respective wear class of the at least one wear class is then allocated to an image point if the image point lies on the tool and a corresponding wear is present at the point of the tool.

In some embodiments, the tool has a processing tool for a tool machine, in particular a cutting tool, for example an indexable cutting insert, for example for a lathe machine or milling machine.

In some embodiments, the neural network is applied by means of the computing unit for each of the image points of the plurality of image points to a surrounding area of the respective image point in order to allocate one of the classes of the predetermined quantity of classes to the respective image point. The surrounding area may be a subset of the plurality of image points and said subset includes the respective image point and is selected or defined according to a predetermined requirement.

By virtue of the fact that a defined surrounding area of the image point is used as an input for the neural network, it is possible for the image information of the image point to be effectively compared with its surrounding points and evaluated. Relative image information in the surrounding area is used in order to characterize or classify the image point.

In some embodiments, the subset for the respective image point is a connected subset. This means that each image point of the subset has at least one adjacent image point of the plurality of image points and said adjacent image point is likewise part of the subset.

In some embodiments, the respective image point, to the surrounding area of which the neural network is applied, is either surrounded or enclosed by remaining image points of the subset or said respective image point is an edge point of the plurality of image points. In this case, for example an image point of the image data set that corresponds to a first or last image point in a row or column can be understood as an edge point.

In some embodiments, the surrounding area includes the respective image point, to the surrounding area of which the neural network is applied, and also all the image points of the plurality of image points that adjoin, in particular directly adjoin, the respective image point. If the image points of the plurality of image points are arranged as described in rows and columns, then the respective image point has eight image points that directly adjoin one another with the result that the subset in this case includes for example nine image points.

In some embodiments, the surrounding area in addition to the adjoining image points of the respective image point also includes all the adjoining image points of the adjoining image points. In other words, the surrounding area includes the respective image point and also the next and the next but one neighboring image points. When the image points are arranged in rows and columns, the surrounding area therefore includes for example 25 image points.

In some embodiments, the surrounding area includes the respective image point and also all the remaining image points of the plurality of image points that have a spacing with respect to the respective image point of less than a predetermined maximum spacing. The surrounding area can be considered as a sliding window that is moved step by step over the entire image data set, wherein for each position of the window a class is allocated to the corresponding image section.

In some embodiments, the surrounding area includes the respective image point and also all the remaining image points of the plurality of image points, which have one row spacing with respect to the respective image point and said row spacing is smaller than a predetermined maximum row spacing, and said image points have one column spacing with respect to the respective image point and said column spacing is smaller than a predetermined maximum column spacing. The surrounding area in such embodiments has for example a rectangular shape.

In some embodiments, the result of the allocation by means of the computing unit is processed with the aid of a morphologic image processing operation and the at least one characteristic value for the level of wear is determined by means of the computing unit based on the processed result.

In some embodiments, the morphologic image processing operation includes an erosion operation and/or a dilation operation.

In some embodiments, the morphologic image processing operation includes an opening operation, in other words in particular an erosion operation followed by a dilation operation. It is possible by, where applicable multiple, applications of the morphologic image processing operation to correct incorrect classifications and it is possible to reduce a noise in the result of the allocation. It is consequently possible to achieve a higher degree of accuracy of the classification and accordingly more accurately determine the level of wear.

In some embodiments, based on the allocation of the classes to the image points of the plurality of image points, in other words based on the result of the allocation, a class image is generated, wherein the class image corresponds to a copy of the image data set and each image point is marked or highlighted in said copy in accordance with the class that is allocated to said image point, for example highlighted in color. In order to process the result of the allocation with the aid of the morphologic image processing operation, for example the class image can be processed by means of the morphologic image processing operation.

In some embodiments, the class image and/or the class image that is processed with the aid of the morphologic image processing operation can be output to a user, for example by means of a user interface, in particular a display or a display unit of the user interface. With the aid of the output, the user can understand which result the allocation or the method according to the improved concept has achieved and which conclusions or recommendations where applicable are output based thereon.

In some embodiments, a proportion of the image points of the plurality of image points, which have been allocated to the at least one wear class, in other words in particular to a wear class of the at least one wear class, is determined by means of the computing unit. By means of the computing unit, a wear area, for example an effective wear area, is determined based on the proportion as a characteristic value for the level of wear, in other words as a characteristic value of the at least one characteristic value. In other words, the result of the allocation includes the proportion of image points, which have been allocated to the at least one wear class, and the at least one characteristic value includes the wear area.

In embodiments in which the morphologic image processing operation is applied, the wear area or the determination of said wear area is to be understood in such a manner that the wear area is determined on any proportion of the image points of the plurality of image points that have been allocated to the at least one wear class and that after the processing by the morphologic image processing operation are still allocated to one of the at least one wear class. The same also applies accordingly for the determination of further characteristic values for the level of wear, in particular the wear mark width.

The proportion can be calculated for example as the number of the points that have been allocated to the at least one wear class divided by the number of all the image points of the plurality of image points. The wear area is then in particular directly proportional to the proportion multiplied by the number of all the image points of the plurality of image points divided by the number of tool image points. The number of tool image points corresponds in this case to the number of image points that are allocated to the at least one wear class or the class for the undamaged tool surface.

In some embodiments, the proportion can also be calculated as the number of the image points that have been allocated to the at least one wear class divided by the number of the tool image points. The area is then directly proportional to the proportion of said image points. The wear area for each tool directly provides information regarding the residual use time of the tool and/or can be a significant indicator for the prevailing level of wear of the tool.

In some embodiments, a further proportion of image points, which have been allocated to the at least one wear class, is determined by means of the computing unit for a column or a row of image points of the plurality of image points. A wear mark width of the column or row is determined based on the further proportion. A further characteristic value of the at least one characteristic value for the level of wear is determined by means of the computing unit based on the wear mark width of the row or column.

In other words, the result of the allocation includes the number of image points of the column or row, which has been allocated to one of the at least one wear classes, and the at least one characteristic value includes the wear mark width of the column or row. The wear mark width can be indicated for example in length units, in other words in meters or millimeters, or in units of image points. The wear mark width is in particular directly proportional to the further proportion. Depending on the tool, the wear mark width, in particular together with accordingly calculated wear mark widths of further rows or columns, can be a significant indicator for the level of wear of the tool.

In some embodiments, a respective further proportion of image points, which have been allocated to the at least one wear class, is determined by means of the computing unit for at least one further column or row of image points of the plurality of image points. A respective further wear mark width of the respective further column or row is determined by means of the computing unit based on the respective further proportions. The further characteristic value is determined by means of the computing unit based on the wear mark width and the further wear mark widths.

The reliability and significance of the further characteristic value is increased by taking into consideration further wear mark widths. In particular, the wear mark width is determined for each column of image points of the plurality of image points or for each row of the plurality of image points and the further characteristic value is determined based on all these wear mark widths. Whether rows or columns of image points are drawn upon for the calculation of the wear mark width depends upon the respective orientation of the tool within the image and/or on a preprocessing of the image data set.

In some embodiments, the at least one characteristic value for the level of wear, in particular the further characteristic value, includes a statistical parameter of all the determined wear mark widths, for example a maximum value, a mean value or a median value.

In some embodiments, the result of the allocation includes a distribution of the image points of the plurality of image points to all the wear classes of the at least one wear class or a variable that is derived from the distribution.

In some embodiments, the wear-relevant region is mapped by means of a camera, in particular a microscope camera apparatus, in order to generate and to provide the image data set. The microscope camera apparatus includes in particular a microscope camera or a microscope and a camera that is coupled to the microscope. As a consequence, an exact and detailed representation of the wear-relevant region and accordingly a high degree of accuracy of the determination of the level of wear is achieved.

In some embodiments, the at least one characteristic value is compared with at least one predetermined limit value by means of the computing unit. By means of the computing unit, a value that relates to a remaining use time of the tool is determined in dependence upon a result of the comparison. The remaining use time of the tool corresponds in particular to a remaining time until it is anticipated that a predefined maximum wear of the tool is reached.

The value that relates to the remaining use time of the tool can correspond for example to a binary value and accordingly can state whether the maximum wear has been reached or not. The value that relates to the remaining use time can also include a time, for example in hours, minutes and/or seconds, and/or a time proportion in percent, in particular related to a total use time of the tool. While the at least one characteristic value is compared with the at least one limit value, in particular each characteristic value of the at least one characteristic value is compared with an associated limit value of the at least one predetermined limit value.

Different limit values of the at least one limit value can also depend on one another or can be defined in relation to one another. It is possible by the determination of the value that relates to the remaining use time to make a decision regarding whether the tool must be exchanged or whether the tool can be used further or when it is necessary to exchange the tool.

In some embodiments, a recommendation to exchange the tool is output depending on a result of the comparison of the at least one characteristic value with the at least one predetermined limit value. In particular, the recommendation to exchange the tool can be output as a visual signal on the user interface. For example, it is possible with the aid of the recommendation to exchange the tool to recommend that the tool is exchanged if one or multiple of the characteristic values are greater or identical to the associated limit value.

In some embodiments, there is a computer-implemented method for training an artificial neural network for determining a level of wear of a tool. In this case, a training image data set is provided that maps a wear-relevant region of a reference tool. A reference allocation of each image point of a plurality of image points of the training image data set to in each case a class of a predetermined quantity of classes is provided, wherein the quantity of classes includes at least one wear class. By means of a training computing unit, an output of the neural network is calculated for each of the image points of the plurality of image points and the output is compared with the reference allocation. By means of the training computing unit, the neural network is adapted in dependence upon a result of the comparison in order to train the neural network. The training computing unit can be the computing unit or a further computing unit that is independent of said computing unit.

A predetermined class of the quantity of classes is allocated to each image point of the plurality of image points by the reference allocation that can be stored for example as a file on a storage medium or a storage unit. The respective reference allocation for an image point can therefore be understood as a label or target for the training of the neural network. The output of the neural network for one of the image points corresponds to an apparent class that the network in the untrained or in part trained state would allocate to the respective image point. This output is compared with the reference allocation in that the apparent class of the respective image point is compared with the class that is allocated in accordance with the reference allocation.

The neural network is in particular adapted in that the weightings of the individual neurons of the neural network are amended in order to reduce a deviation of the output of the reference allocation of the respective image point. In order to calculate the output of the neural network, in particular as described above in relation to the computer-implemented method for determining a level of wear, the neural network is applied to a surrounding area of the respective image point.

In some embodiments, the neural network is trained by means of a method for training an artificial neural network according to the improved concept. The method steps of the method for training the neural network are then also method steps of the method for determining the level of wear. In particular, the training of the artificial neural network is performed prior to the allocation of the image point of the image data set to the corresponding classes. In addition, however a repetition of the training is also possible at a later point in time in order to optimize the model of the neural network.

In some embodiments, the neural network has been trained by means of a method for training an artificial neural network according to the improved concept. The method steps of the method for training the neural network are then performed prior to the method steps for the method for determining the level of wear and are themselves not part of the method for determining the level of wear.

Further embodiments of the method for training an artificial neural network according to the improved concept follow directly from the different embodiments of the method for determining the level of wear of a tool according to the teachings herein and vice versa.

In some embodiments, there is an analysis system for determining a level of wear of a tool. The analysis system has a computing unit and also a storage unit. An image data set is stored on the storage unit and said image data set maps a wear-relevant region of the tool. The computing unit is configured so as to allocate to each image point of a plurality of image points of the image data set in each case a class of a predetermined quantity of predetermined classes using an, in particular trained, artificial neural network, in particular a convolutional neural network, wherein the quantity of classes includes at least one wear class.

The computing unit is moreover configured so as to determine at least one characteristic value for the level of wear based on a result of the allocation of the image points of the plurality of image points to the respective class. The storage unit can include in particular one or multiple storage media. The neural network is in particular stored on the storage unit. The classes of the predetermined quantity of classes are for example likewise stored on the storage unit.

In some embodiments, the analysis system includes an output unit, for example an image output unit, in particular in order to output to a user of the analysis system a class image or a class image that is processed with the aid of a morphologic image processing operation.

In some embodiments, the analysis system has a microscope camera apparatus that is configured so as to map the wear-relevant region of the tool in order to generate the image data set. The microscope camera apparatus or the computing unit is in particular configured so as to store the image data set on the storage unit.

In some embodiments, the neural network is trained by means of a method for training the artificial neural network according to the improved concept.

Further embodiments of the analysis system incorporating teachings of the present disclosure are provided directly from the various embodiments of the method for determining the level of wear and also the method for training the artificial neural network according to the improved concept and in each case vice versa. In particular, the analysis system is configured or programmed so as to implement a method according to the improved concept or the analysis system implements a method according to the improved concept.

In some embodiments, there is a computer program having commands. When the computer program is implemented by a computer system, in particular by an analysis system as described herein, for example by the computing unit of the analysis system, the commands trigger the computer system so as to implement a method for determining the level of wear of a tool.

In some embodiments, further commands trigger the computer system so as to implement a method for training an artificial neural network.

In some embodiments, there is a computer-readable storage medium and a computer program and/or a further computer program is stored on said computer-readable storage medium.

The features and feature combinations that are mentioned above in the description and also the features and feature combinations that are mentioned below in the description of the figures and/or are illustrated alone in the figures are not only usable in the combination disclosed in each case, but rather can also be used in other combinations without departing from the scope of the disclosure.

FIG. 1 illustrates a schematic illustration of an analysis system 20 incorporating teachings of the present disclosure. The analysis system 20 has a computing unit 12 and also a storage unit 19 that is coupled to the computing unit 12. In particular, an image data set 10 is stored on the storage unit 19 and said image data set 10 maps a wear-relevant region 11 of a tool 16.

Furthermore, a software module having an artificial neural network 13 is stored on the storage unit 19, wherein the neural network 13 in particular includes a convolutional neural network 25. The neural network 13 is therefore also itself referred to as a convolutional neural network CNN. Optionally, the analysis system 20 has a microscope camera apparatus 17 and the tool 16, in particular the wear-relevant region 11 of the tool 16 can be mapped by means of said microscope camera apparatus in order to generate the image data set 10. Optionally, the analysis system 20 can also have an image output unit 34 in order to provide a user of the analysis system 20 with visual output.

The tool 16 can in particular be a cutting tool for a tool machine. For example, the tool 16 can be an indexable cutting insert for a tool machine, for example for a lathe or a milling machine. The wear-relevant region 11 of the tool 16 corresponds then in particular to a cutting edge or a part of a cutting edge of the tool 16.

The systems, however, are not limited to cutting tools or even to indexable cutting inserts. The described steps and embodiments apply similarly for other tool types. An exemplary architecture and topology of the neural network 13 is described below and said architecture and topology is suitable for application in an analysis system 20 or a method according to the improved concept. However, where applicable it is also possible to use other architectures.

The neural network 13 illustrated in FIG. 1 has three consecutive convolutional levels 26, 27, 28. Each convolutional level 26, 27, 28 includes in this case for example a convolutional layer in the proper sense, followed by an activation function, in particular a rectifier-activation function, which can also be referred to as a rectified linear unit activation function, RELU activation function for short and also furthermore followed by a pooling layer. The pooling layer can be embodied so as to implement a 2×2 maximum value pooling or a 2×2 average value pooling.

The individual convolutional levels 26, 27, 28 or in the proper sense the convolutional layers of said convolutional levels can realize for example in each case a different number of filters. In this case, the number of filters can increase for example from the first convolutional level 26 via the second convolutional level 27 toward the third convolutional level 28. In particular, the number of filters of the second convolutional level 27 can be twice as large as the number of filters of the first convolutional level 26 and half as large as the number of filters of the third convolutional level 28.

An output of the third convolutional level 28 or the CNN 25 is in general multidimensional. In a flat layer 29 that follows the CNN, the output of the CNN 25 is transferred into a one-dimensional feature vector.

As shown, a conventional neural network 30 is connected downstream for example of the flat layer 29. The neural network 30 includes for example a classifier having for example two hidden levels 31, 32, in particular dense layers 31, 32. The dense layers 31, 32 can form in particular a multilayer perceptron. The neural network 30 moreover has an output layer 33 that is connected downstream of the dense layers 31, 32. For example, a softmax function can be used for the classification. A neural network 13 that is constructed in this manner can allocate a class from a predetermined quantity of classes to an input that corresponds for example to a part of the image data set 10.

An artificial neuron for each class of the predetermined quantity of classes is located in the output layer 33, therefore in the case of five classes accordingly five neurons. The function of the analysis system 20 is further explained below with reference to FIG. 2 with the aid of the methods described there.

Figure 2:
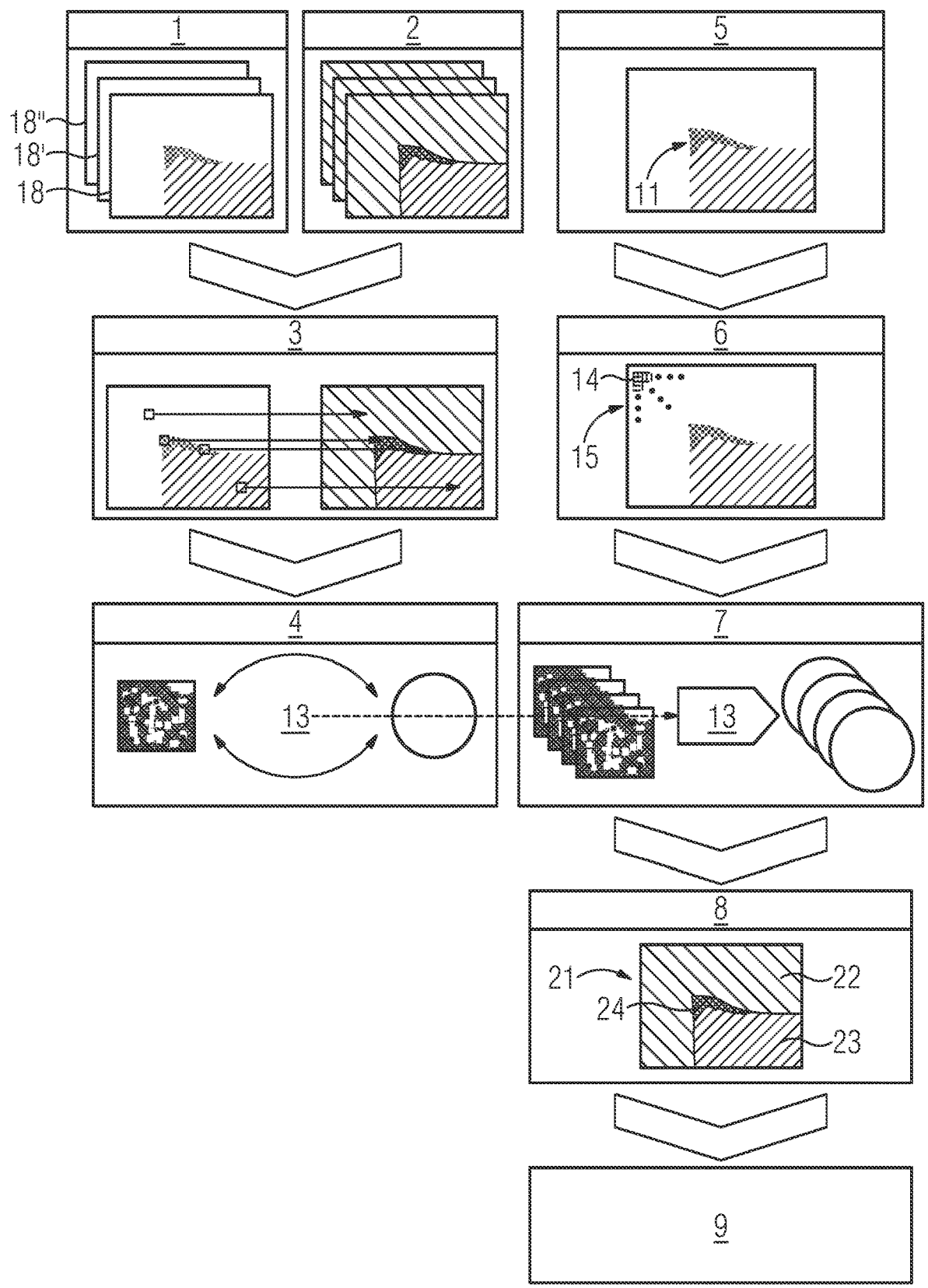
FIG. 2 shows a flow chart of an exemplary embodiment of a method for training a neural network incorporating teachings of the present disclosure and also a flow chart of an exemplary embodiment of a method for determining a level of wear of a tool incorporating teachings of the present disclosure.

A flow chart of a method for training a neural network 13 so as to determine a level of wear of a tool 16 incorporating teachings of the present disclosure is illustrated in FIG. 2. In particular, method steps 1 to 4 are illustrated that represent the method for training the artificial neural network 13. Furthermore, a flow chart of a method for determining a level of wear of a tool 16 is illustrated, in particular by the method steps 5 to 9. Below, it is assumed that the analysis system 20 is used both for the training phase in other words so as to implement the method for training the neural network 13 as well as for the operative phase, in other words so as to implement the method so as to determine the level of wear of the tool 16. This is however not necessary since the training phase is independent of the operative phase.

In step 1 of the method for training the neural network 13, a training image data set 18 is provided that maps the wear-relevant region of a reference tool. The reference tool is for example a tool of the same type or comparable type as the tool 16, the level of wear of which is to be determined in the operative operation. The training image data set 18 is illustrated in particular in high-resolution. For example, the edge of the reference tool can be provided with a resolution of at least 100 image points per millimeter.

In step 2 of the method, a reference allocation of each image point of the training image data set 18 to a class of a predetermined quantity of classes is provided. In other words, a data set is provided from pairs of wear images and associated classes per image point or pixel. By means of the computing unit 12, the untrained or in part trained neural network 13 is applied one after the other to each image point inclusive of a predefined surrounding area of the respective image point. The computing unit 12 compares the respective output of the neural network 13 with the corresponding reference allocation.

In order to learn the relationships between the input data, in other words the training image data set 18 and the output values, in other words the associated classes, the neural network 13 is adapted by the computing unit 12 in step 4 of the method, in particular the corresponding weightings of the neural network, in particular of the CNN 25, are adapted in such a manner that the error between the input data and output values is reduced. The described steps are repeated for a plurality of further training image data sets 18', 18", until the neural network 13 has been sufficiently trained, the error in the case of an allocation therefore lies in a predetermined acceptable tolerance range.

In some embodiments, the quantity of predetermined classes includes for example five classes, wherein for example three of the five classes are wear classes. A wear class in this case represents in particular a typical type of wear of the tool 16. In the case of a cutting tool, a first wear class can be for example an area wear class, in other words can represent a surface wear on the tool 16. A second wear class can be a groove class that represents ditch-shaped, groove-shaped or rib-shaped wear features. A third wear class can be a built up cutting edge class that represents wear features that arise on account of an accumulation of workpiece material on the tool, in other words so called built up cutting edges. A background class can be used as a further class that for example is allocated to an image point if this does not lie on the tool surface. In some embodiments, other class types, in the case of other tool types in particular also other wear classes, can be advantageous.

For the training phase, a diverse data set that is embodied from tool images and the respective classes may be available. For example, images of various tools, in particular of various forms and materials, for example in different levels of abrasion and also under various lighting conditions are analyzed. As a consequence, the trained CNN is particularly robust with respect to interference factors such as a deviating lighting.

In step 5 of the method for determining the level of wear, an image data set 10 is provided, in particular stored on the storage unit 19, and said image data set maps the wear-relevant region 11 of the tool 16, in other words in particular a cutting edge of the tool 16. The image data set 10 can be generated in this case in particular by means of the microscope camera apparatus 17.

The image data set 10 is analyzed afterward in step 6 of the method in a pixel-by-pixel manner, in other words image point for image point, in that the image data set 10 is divided into individual image regions 15. Each image region 15 in this case can include an image point 14 and a class is to be allocated to said image point by means of the neural network 13 and said image region can also include further image points that surround this image point 14, further image points that directly adjoin the image point 14. In the case of a grid arrangement of rows and columns, the image data set 10 would be divided for example into image regions having in each case 3×3, in other words nine, image points.

In step 7 of the method, the computing unit 12 applies the trained neural network 13 to each image point 14 in that said training neural network uses the respective image region 15 as an input for the neural network 13 and accordingly allocates one of the classes to the respective image region 15 and therefore to the image point 14 that is taken into consideration.

After the evaluation of all the image points in this manner, in step 7 optionally a post processing is performed so as to reduce signal noise. In this case, by means of the computing unit 12 an opening operation, in other words an erosion operation followed by a dilation operation can be applied to the classified image. The opening operation can also be performed multiple times, for example three times in a row. In some embodiments, a rectangular kernel, for example of the size 12×8 image points, is used for the opening operation.

In step 8, the cleaned class image 21 is schematically represented. Image points which, after the processing, are allocated to the background class are designated 22. Image points which, after the post processing, have been allocated to the class for the undamaged tool surface are designated 23. Any image points that have been allocated to one of the wear classes are designated 24. The cleaned class image 21 can be displayed on the display unit 34 for example to a user so as to improve understanding.

In the image cleaned in this manner, in step 9 of the method by means of the computing unit 12 at least one characteristic value can be determined for the level of wear of the tool 16. For this purpose, it is possible for example to determine the entire wear area as the number or the proportion of the image points that have been allocated to one of the wear classes.

In some embodiments, it is also possible to determine a maximum and/or average wear mark width and/or a median of the wear mark width. For this purpose, the cleaned class image can be oriented for example in such a manner that the upper side of the wear-relevant region 11 is oriented horizontally. The number of image points that have been allocated to the wear classes, can be determined as a wear mark width by means of the computing unit 12 for each column. Subsequently, it is possible for example to calculate the maximum value, the average value or the median value of the wear mark width.

The conversion of image points to SI units can be performed with the aid of a single calibration. For this purpose, an image having marks of a fixed defined spacing can be recorded, for example a grid having a line spacing of 1 mm or the like and the spacing of the marks can be determined in image points with the result that it is possible to produce the relationship between SI units and image point size.

The characteristic values that are determined in this manner for the level of wear, in other words wear area, maximum or average wear mark width or the median of the wear mark width, can be compared with associated predefined limit values that correspond for example to the maximum wear. If a limit value is exceeded, the tool 16 can be exchanged. For this purpose, the computing unit 12 can generate a corresponding visual output for example on the display unit 34. Otherwise, the prevailing state of the tool 16 or the remaining use time can be output.

The respective information on the one hand can be reported back for example to a controller of the tool machine. On the other hand, the information can be transmitted to a local edge device and/or to a cloud in order to render it possible there to provide insight into the prevailing process state and therefore to render possible continuing analysis, for example with regard to the influence of material batch or machine parameters on the resulting wear.

Methods incorporating the teachings of the present disclosure moreover offer the possibility of increasing the acceptance of methods of machine learning and artificial intelligence in industrial environments since it is not only possible to determine abstract values but rather a classified image is created as an intermediate step. For the understanding of the relevant decisions, this can be represented by superimposition of the camera image having the identified wear region for a machine operator via an output interface, for example an external tablet computer.

The direct wear measurement with reference to the image data is less susceptible to signal noise and interference factors from the environment than is the case in indirect measuring methods. The use of deep learning concepts in the form of a CNN distinguishes itself owing to a particularly robust behavior. The method that is used renders it possible to identify the wear as such in images independent of the cutting geometry, the tool material or a coating of the tool.

The example methods can also be applied for the evaluation of images that are recorded under different lighting conditions. A further advantage is the consistency that shows both on the tool machine itself as well as rendering possible a connection to the cloud and consequently global analyses. The information regarding the level of wear of the tool, which is obtained by means of the improved concept, renders it possible to more precisely determine the remaining use time of the tool and consequently to optimize the product quality or to reduce the production costs by more efficiently utilizing tools.

What is claimed is:

1. A method for determining a level of wear of a tool, the method comprising:
   obtaining an image data set mapping a wear-relevant region of the tool, the image data set including a plurality of pixels;
   allocating, using a computing unit and an artificial neural network, one class of a predetermined quantity of classes to each image point of the plurality of pixels;
   wherein the quantity of classes includes at least one wear class, a background class, and an undamaged class;
   determining a characteristic value indicating a level of wear based on a quantity of pixels allocated to the at least one wear class; and
   automatically electing to continue using the tool or to replace the tool based on the characteristic value.

2. The method as claimed in claim 1, wherein the neural network is applied by the computing unit to a surrounding area of each respective pixel to allocate one of the classes to the respective pixel.

3. The method as claimed in claim 2, wherein the surrounding area includes the respective pixel and also all the pixels that adjoin the respective pixel.

4. The method as claimed in claim 2, wherein the surrounding area includes the respective pixel and all the remaining pixels with a spacing with respect to the respective pixel smaller than a predetermined maximum spacing.

5. The method as claimed in claim 2, wherein the surrounding area includes the respective pixel and also all the remaining pixels that have one row spacing with respect to the respective pixel and said row spacing is smaller than a predetermined maximum row spacing, and said pixels have one column spacing with respect to the respective pixel and said column spacing is smaller than a predetermined maximum column spacing.

6. The method as claimed in claim 1, further comprising:
   processing the result of the allocation by the computing unit with the aid of a morphologic image processing operation; and
   determining the characteristic value for the level of wear based on the processed result.

7. The method as claimed in claim 1, further comprising:
   determining a fraction of the plurality pixels allocated to the at least one wear class; and
   determining a wear area based on the fraction as a characteristic value for the level of wear.

8. The method as claimed in claim 1, further comprising:
   determining a further fraction of pixels allocated to the at least one wear class, for a respective column or a row of pixels;
   determining a wear mark width of the column or row based on the further fraction; and
   determining a further characteristic value based on the wear mark width.

9. The method as claimed in claim 8, further comprising:
   determining a third fraction of pixels allocated to the at least one wear class, for at least one further column or row of pixels;
   determining a respective further wear mark width of the respective further column or row based on the third fraction; and
   determining the further characteristic value based on the wear mark width and the further wear mark widths.

10. The method as claimed in claim 1, further comprising mapping the wear-relevant region with a camera to generate and to provide the image data set.

11. The method as claimed in claim 1, further comprising:
comparing the characteristic value with a predetermined limit value using the computing unit; and
determining a value that relates to a remaining use time of the tool in dependence upon a result of the comparison.

12. A method for training an artificial neural network to determine a level of wear of a tool, the method comprising:
obtaining a training image data set mapping a wear-relevant region of a reference tool;
referencing a reference allocation of each image point of a plurality of image points of the training image data set to a class of a predetermined quantity of classes, wherein the quantity of classes includes a wear class, a background class, and an undamaged class; and
using a training computing unit, calculating an output of the neural network for each of the image points;
comparing the output with the reference allocation; and
using the training computing unit, adapting the neural network based upon a result of the comparison.

13. An analysis system for determining a level of wear of a tool, the analysis system comprising:
a computing unit;
a storage unit;
an image data set stored on the storage unit, wherein said image data set maps a wear-relevant region of the tool;
wherein the computing unit is programmed to:
allocate to each image point of a plurality of image points of the image data set a class of a predetermined quantity of classes using an artificial neural network, wherein the quantity of classes includes a wear class, a background class, and an undamaged class; and
determining a characteristic value indicating a level of wear based on a quantity of pixels allocated to the at least one wear class; and
automatically electing to continue using the tool or to replace the tool based on the characteristic value.

14. The analysis system as claimed in claim 13, further comprising a microscope camera configured to map the wear-relevant region of the tool to generate the image data set.

* * * * *